United States Patent [19]

Mehnert

[11] 4,260,358

[45] Apr. 7, 1981

[54] MOLDING DEVICE

[76] Inventor: Johannes Mehnert, Ernststrasse 11, 5205 St. Augustin 3, Menden, Fed. Rep. of Germany

[21] Appl. No.: 80,931

[22] Filed: Oct. 1, 1979

Related U.S. Application Data

[63] Continuation-in-part of Ser. No. 913,876, Jun. 8, 1978, abandoned.

[51] Int. Cl.³ ............................................. B29C 17/07
[52] U.S. Cl. ................................. 425/532; 425/541; 425/451; 425/451.3
[58] Field of Search ................ 425/522, 541, 450.1, 425/451, 451.2, 451.3, 451.4, 451.5, 451.6, 451.7, 451.9, 532

[56] References Cited

U.S. PATENT DOCUMENTS 3,277,534  10/1966  McDonald .................. 425/541
3,964,852   6/1976  Marfiewicz ................... 425/541

FOREIGN PATENT DOCUMENTS 627018  9/1961  Canada ............................ 425/541
2542015  3/1977  Fed. Rep. of Germany ......... 425/541

*Primary Examiner*—Jan H. Silbaugh
*Attorney, Agent, or Firm*—Norman S. Blodgett; Gerry A. Blodgett

[57] ABSTRACT

A molding device for the manufacture of hollow plastic articles comprising of a two part separable mold, a pre-cast station, a blow station, means for moving the mold halves between the closed and open positions, and means for moving the mold between the preform station and blow station. The mold is supported for movement between the open and closed position by a single supporting spar and locking means are employed for locking the mold parts in the closed position.

10 Claims, 14 Drawing Figures

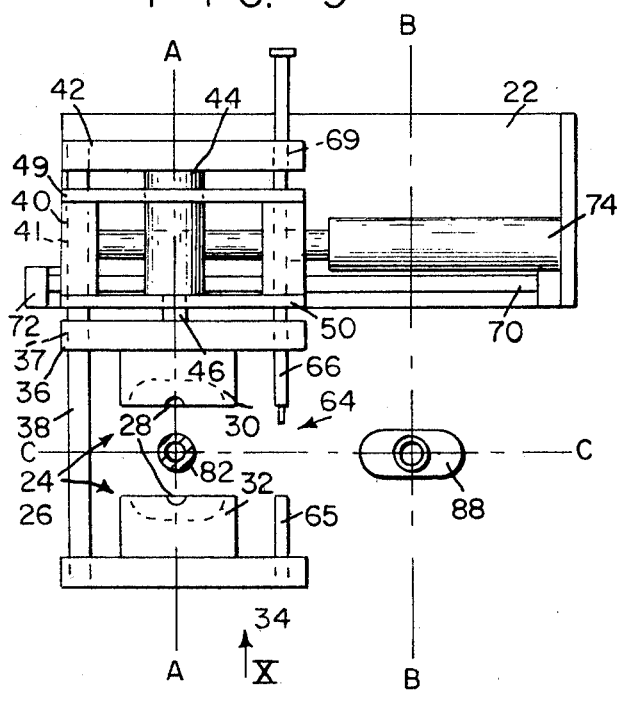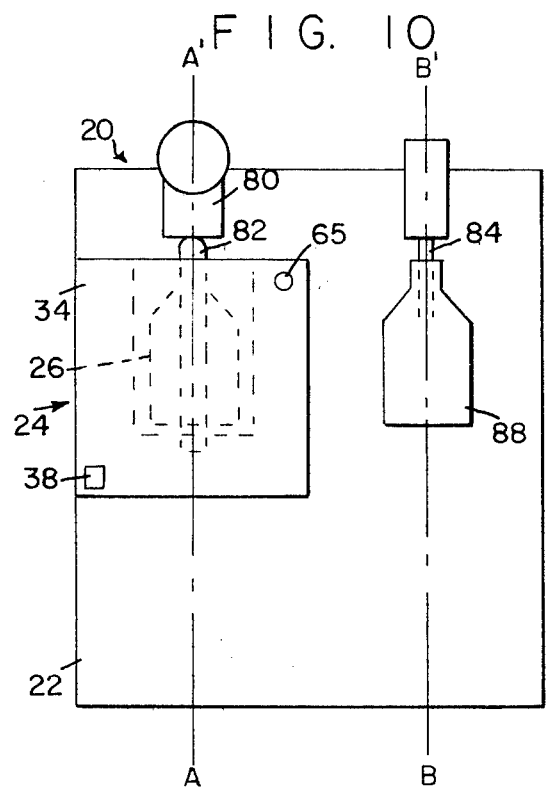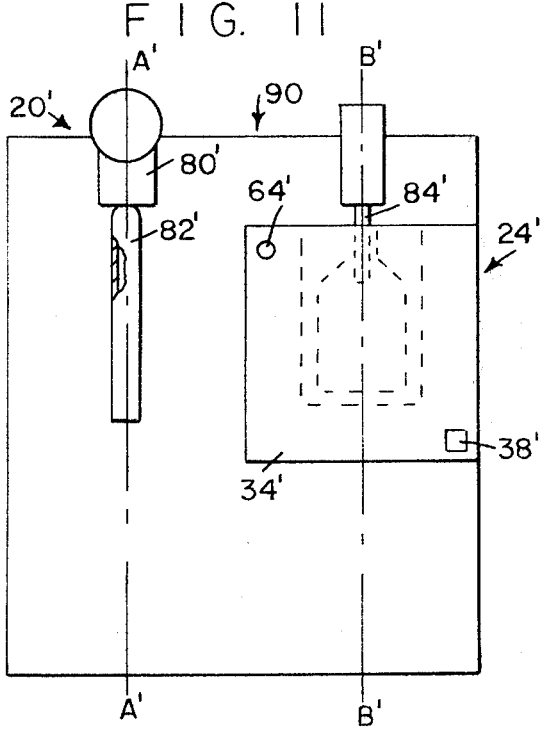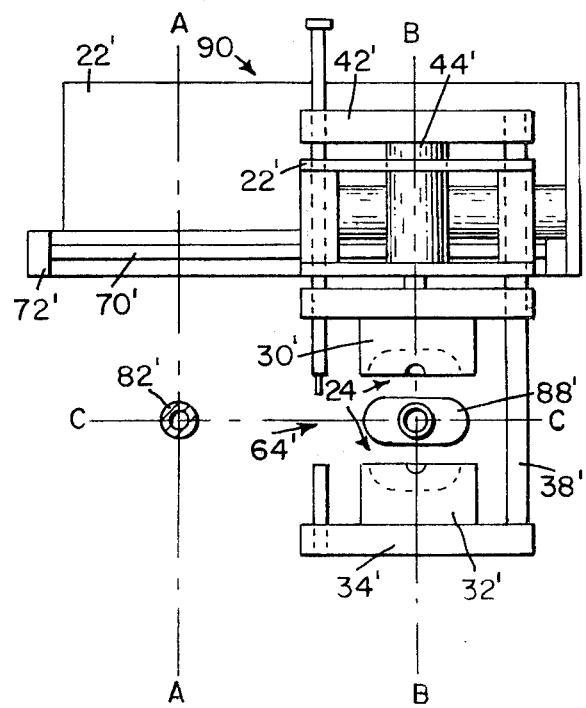

MOLDING DEVICE

REFERENCE TO COPENDING APPLICATIONS

This is a continuation-in-part of patent application Ser. No. 913,876 filed June 8, 1978, now abandoned.

BACKGROUND OF THE INVENTION

The invention relates to a device for the manufacture of hollow articles out of plastics, especially thermoplastics, e.g., by the blow molding process, consisting of several hollow-mold parts, which take up a preform for the blowing process, whereby at least one hollow-mold part is movably disposed on a spar guide, and whereby locking devices are provided at the hollow-mold parts.

For the manufacture of hollow articles out of thermoplastic synthetics through the blowing up of the preform in the blowing device there are known mold locking systems that have in each corner of the mold clamping plates, that is a total of four locking spars, in order to obtain a uniform distribution of force over the locking frame. Such a four-spar locking system ensures, to be sure, an optimal closure of the hollow-mold parts while the blowing process is carried out, but greatly impedes the charging of the blowing devices with preforms and the ejection of the finished molded articles.

From the West German patent publication DT-OS 24 28 914 is also already known a device for the manufacture of hollow articles of thermoplastic synthetics, whereby the movable mold carriers for the hollow mold are carried by two spars disposed underneath the hollow mold. The spars are thereby exclusively disposed at the lower portion of the locking frame. This arrangement is said to render it possible that the space between the mold carriers in which is disposed the split cavity mold, remains far-reachingly freely accessible when the hollow mold is open, so that larger molded articles are claimed to be freely removable after the opening of the hollow mold without impediment by spars before the hollow mold is moved away.

In practice this is, however, not the case because the second spar causes especially in the case of elongated preforms, a considerable restriction of the feeding possibilities of the preform. Furthermore, an additional locking mechanism is required.

The invention has the task to indicate a principle of design for the initially mentioned devices with which are created optimal spatial conditions for the charging of the blowing devices with preforms. This task is solved in accordance with the invention in that, that the spar guide consists of only one spar with guide part.

SUMMARY OF THE INVENTION

On a preferred embodiment of the invention the guide part is developed as a guide ledge at the spar. The guide part can also be constructed on the spar and the movable hollow-mold part thereon as a reciprocally mating profiling.

In accordance with another advantageous development of the invention the guide part can be constructed as a skid, disposed on the movable hollow-mold part, which is slidingly braced against a table-like support element of the preform station.

Furthermore, on a device in accordance with the invention, where one or several guide parts are provided separate from the spar, the one or the several guide parts can be disposed in the same corner region as the spar.

The invention has the advantage that the spatial conditions for the feed of the preform into the hollow-mold are substantially more favorable than on the known devices because the spar guide systems known from the state of art are restricted with the aid of the invention to practically one single region of the mold system. Particularly in the case of an initially injected tubular extruded preform this can be fed with the injected part without hindrance from below to the top. The locking can therefore be carried out singly or several times at optional sites.

Through the spar guide of the invention, the space for the feed of the preform is however not only spatially enlarged but also the technically functional course of the feed process has been substantially simplified, which fact results in a constructional simplfication of the feed device so that the whole equipment is thereby no longer so costly and less troubleprone. The preform can simply be fed as an extruded tube from an extruder to the hollow mold without any special precautions and specific positional concern. The finished hollow article can also be removed laterally or downwardly, which is particularly favorable for the process of ejection and removal.

It has been found that despite the high compression forces that are exerted during the blowing on the mold halves, which endeavor to press the mold halves apart, one single locking device, lying diametrically opposite to the spar, is sufficient to safely contain the large compressive forces so that it is possible to make do with the application of one single per se known locking device. The present invention keeps to a minimum the expense for the guide of the hollow-mold parts as also their locking and yet allows for optimal technical performance.

BRIEF DESCRIPTION OF THE DRAWINGS

FIG. 9 is a schematic plan view similar to FIG. 1, and showing the mold in open position at the preform station after separation of the hollow article from the mold and just prior to insertion of the next preform, FIG. 10 is a schematic front elevational view looking in the direction of arrow X of FIG. 9, FIG. 11 is a schematic front elevational view similar to FIG. 6 showing a first modification, FIG. 12 is a schematic plan view of the first modification.

DESCRIPTION OF THE PREFERRED EMBODIMENT

Figure 1:
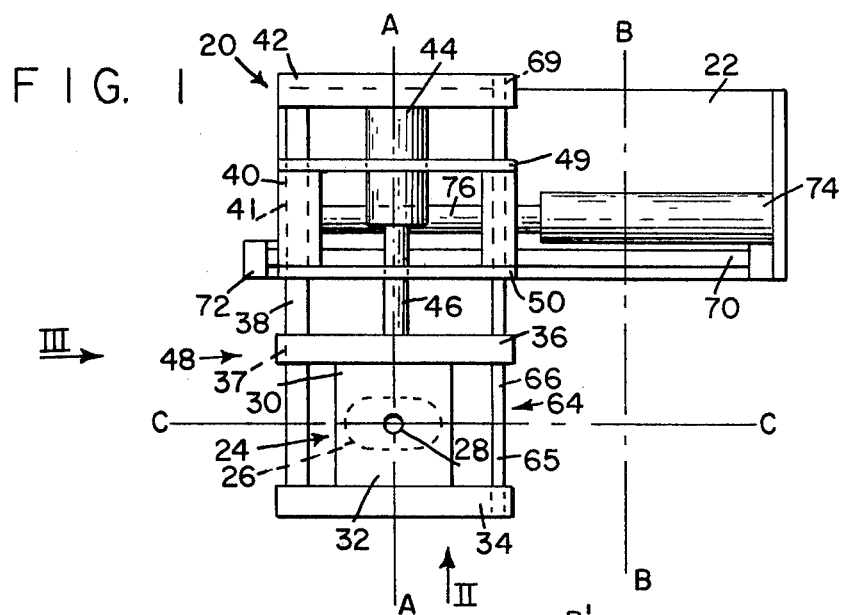
FIG. 1 is a schematic plan view of a molding device embodying the principles of the present invention.
Figure 2:
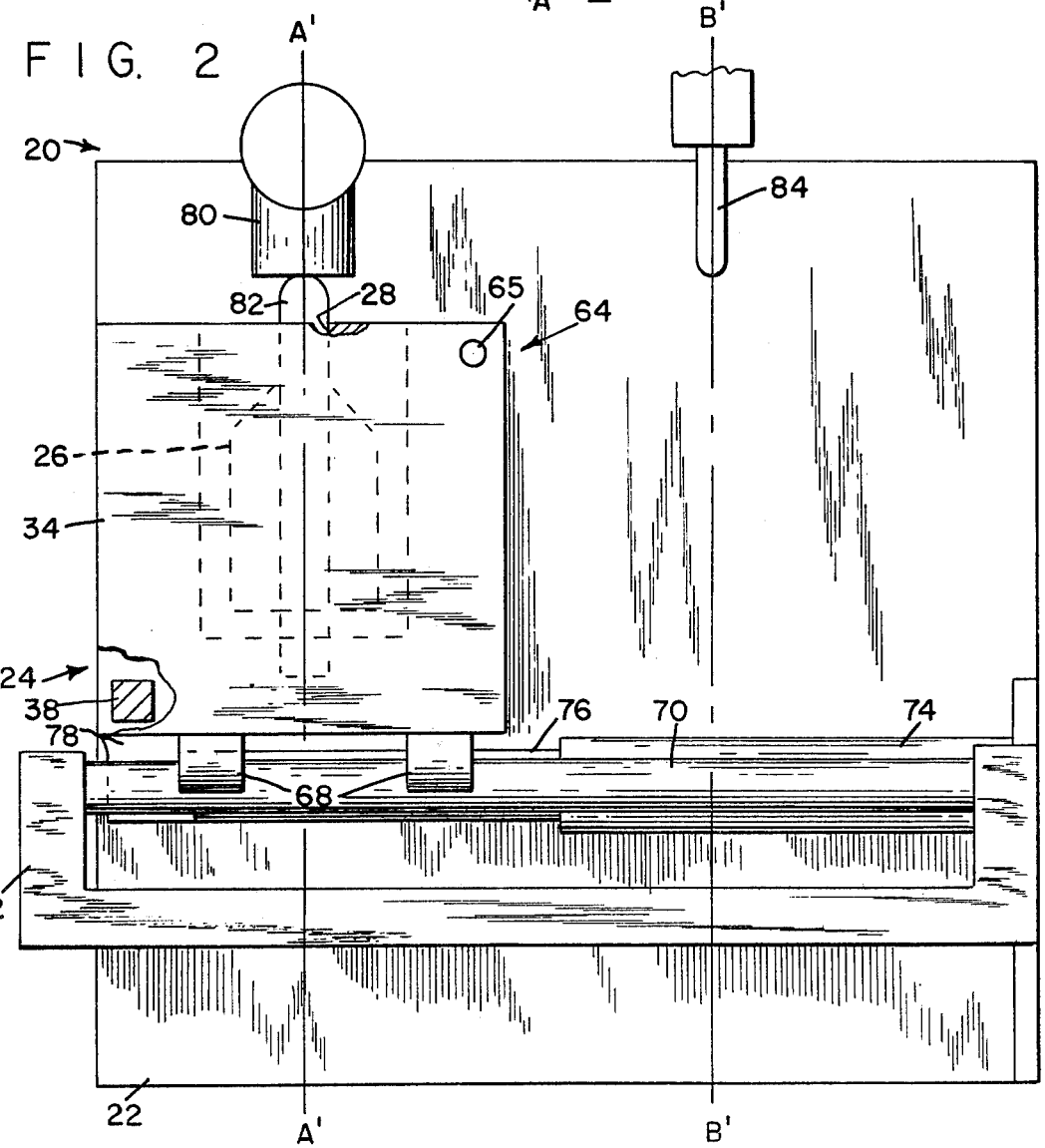
FIG. 2 is a front elevation of a molding device looking in the direction of arrow II of FIG. 1.
Figure 3:
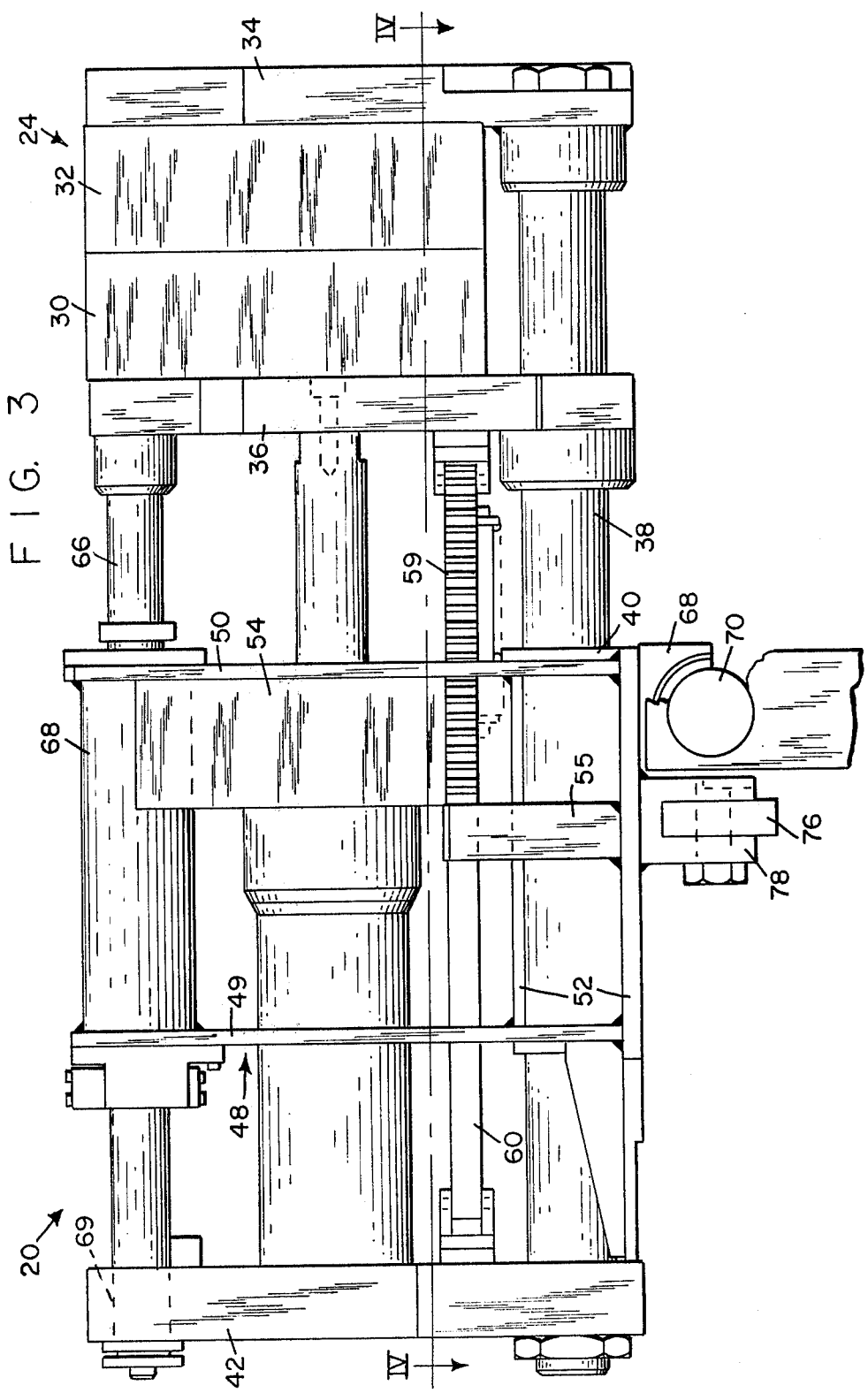
FIG. 3 is a detailed side elevation of a molding device looking in the direction of arrow III of FIG. 1.

Referring first to FIGS. 1, 2, and 3, the molding device of the present invention is generally indicated by the reference numeral 20 and includes a frame 22 for supporting a mold generally indicated by the reference numeral 24.

Mold 24 has a cavity 26 having the shape of the article to be formed as for example a bottle, the outline of which is shown in FIG. 2. There is an opening 28 at the top of the mold which leads to the cavity 26. Mold 24 is divided along a vertical plane, indicated by dot and dash C—C line in FIG. 1, which extends through the cavity to form two mold halves indicated at 30 and 32. Mold half 32 is supported on a front plate 34 and mold half 30 is supported on a rear plate 36. A supporting spar 38 is mounted within a sleeve 40 for sliding motion along the central longitudinal axis of the spar. Sleeve 40 forms part of a movable frame work of the apparatus. The forward end of supporting spar 38 is fixed to front plate 34 at the lower left-hand corner of the plate below the cavity 26, as shown in FIG. 2. The rearward end of spar 38 is fixed to cross bracket 42. Rear plate 36 is slidingly mounted on supporting spar 38 for movement along the central longitudinal axis of the spar. Spar 38 extends through the lower left-hand corner of plage 36 below the mold cavity. The cross section of supporting spar 38 is polygonal, preferably of square cross section and extends through apertures 37 and 41 in rear plate 36 and sleeve 40, respectively. Apertures 37 and 41 have the same cross sectional shape as the supporting spar 38 which allows for relative sliding motion between the spar in each of the members 36 and 40, but prevents rotational movement of the rear plate 36 about the longitudinal axis of the spar.

A hydraulic cylinder 44 is fixed to cross bracket 42. A piston 46 extends from cylinder 44 and is fixed to rear plate 36.

Sleeve 40 is mounted on a carriage generally indicated by the reference numeral 48 comprising a pair of vertical plates 49 and 50 connecting plates 52 and a supporting bracket 54, see FIG. 3.

Figure 4:
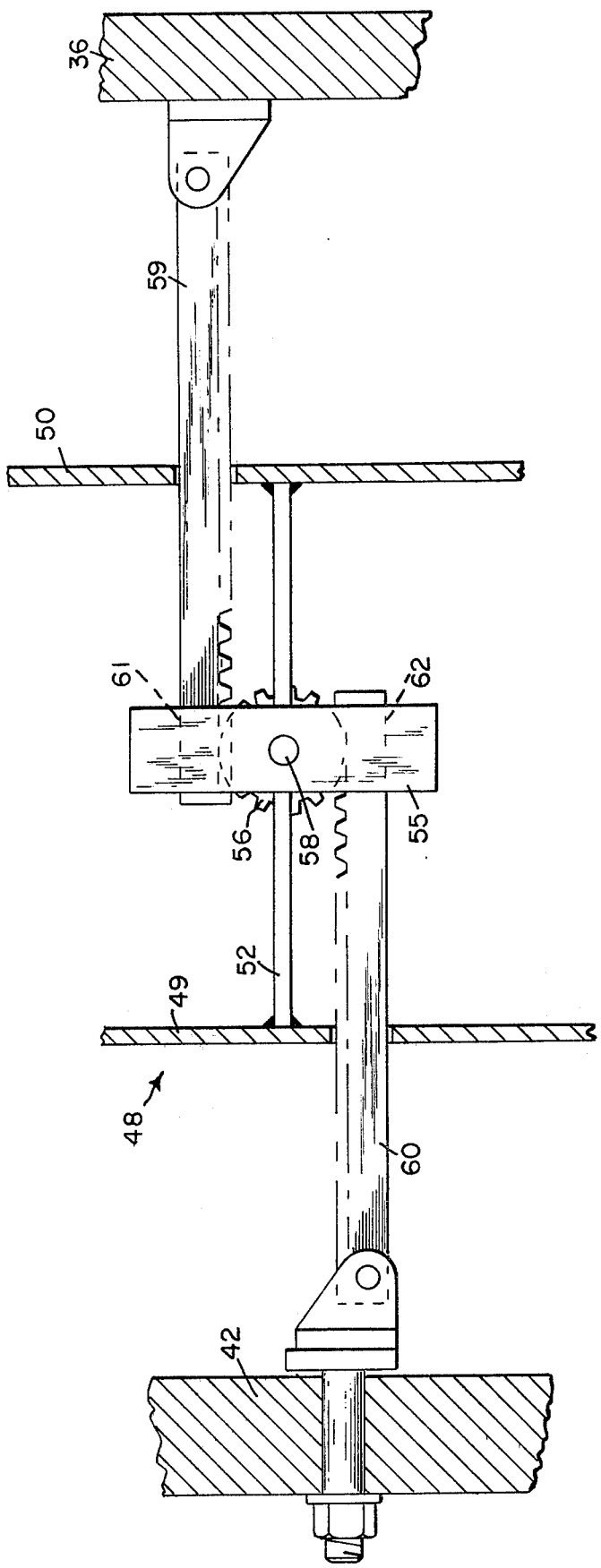
FIG. 4 is a horizontal sectional view taken on the line IV—IV of FIG. 3.

Referring primarily to FIGS. 3 and 4, a gear box 55 is supported on the carriage 48 and contains a pinion gear 56 mounted for rotation about a shaft 58. A first toothed rack extends through to an aperture 61 in the gear box 55 and drivingly engages one side of the pinion gear 56. A second toothed rack 60 extends through a second aperture 62 in the gear box 55 and drivingly engages the opposite side of pinion gear 56. Rack 59 is connected to rear plate 36 and rack 60 is connected to cross bracket 42, so that upon rotation of gear 56, rack 59 and 60 move in opposite directions. Rotation of gear 56 in one direction causes rear plate 36 and cross bracket 42 to move toward one another and rotation of gear 56 in the opposite direction causes plate 36 and bracket 42 to move apart. Since supporting spar 38 is connected to cross bracket 42 and front plate 34, all three elements move as a unit along the central longitudinal axis of the supporting spar. Cylinder 44 provides the driving force for opening and closing the mold halves. FIG. 1 shows the mold halves drawn together in the closed position at which time the piston 46 is extended from cylinder 44.

Since cross bracket 42 and rear plate 36 are connected through the rack and pinion drive shown in FIG. 4, withdrawing of piston 46 into cylinder 44 causes bracket 42 and rear plate 36 to move toward one another by an equal amount. This, in turn, causes the supporting spar 38 to move forwardly, as shown in FIG. 1 and rear plate 36 to move rearwardly relative to the supporting spar 38. The effect of this motion causes mold halves 30 and 32 to move in opposite directions from plane C—C by an equal amount to an open position, as shown in FIG. 9.

Referring to FIG. 1, the molding device of the present invention is also provided with locking means generally indicated by the reference numeral 64 and comprises a first locking element 66 attached to rear plate 36. Locking element 66 extends freely through a sleeve 68 mounted on the carriage 48 and through an aperture 69 in cross bracket 42. As shown in FIG. 2, locking means 64 is located adjacent the upper right-hand corner of the mold, diametrically opposed to the supporting spar 38. When the mold is in closed position as shown in FIG. 1, elements 64 and 66 are engaged in a locking relationship. When the mold halves are separated as shown in FIG. 9, locking elements 65 and 66 are separated and unlocked.

Figure 5:
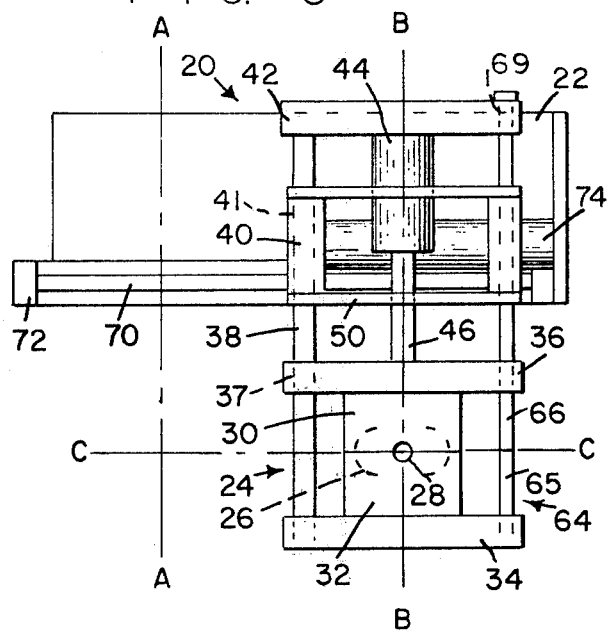
FIG. 5 is a schematic plan view similar to FIG. 1 showing the mold at the blow station in the closed position.

Referring to FIGS. 2 and 3, a pair of bearing blocks 68 extend downwardly from the bottom of carriage 48 and rest on a guide shaft 70 supported in a U-shaped bracket 72 which forms part of the stationary framework 22. The entire carriage assembly 48 is supported on guide shaft 70 through the bearing block 68 for sliding motion along the guide shaft 70. The drive for moving the carriage along shaft 70 is provided by a cylinder 74 mounted on the framework 22. A piston 76 extends from cylinder 74 and has a flattened end attached to a bracket 78 extending downwardly from the bottom of the carriage, as shown in FIG. 3. Piston 76 is shown in the extended condition in FIG. 1, so that the carriage and mold occupy the extreme left-hand position as viewed in FIG. 1. When cylinder 74 is actuated to draw piston 76 within the cylinder the entire carriage assembly and mold are drawn to the right as viewed in FIG. 1, to an extreme right-hand position as shown in FIG. 5. When the mold is at the left-hand position as shown in FIG. 1, the central longitudinal axis of the piston 46 is coincident with a horizontal axis A—A. When the mold is at the right-hand position shown in FIG. 5, the central longitudinal axis of the piston 46 is coincident with a horizontal axis B—B. This can be seen in FIGS. 1 and 5. Axis A—A and B—B each intersect line C—C.

Figure 6:
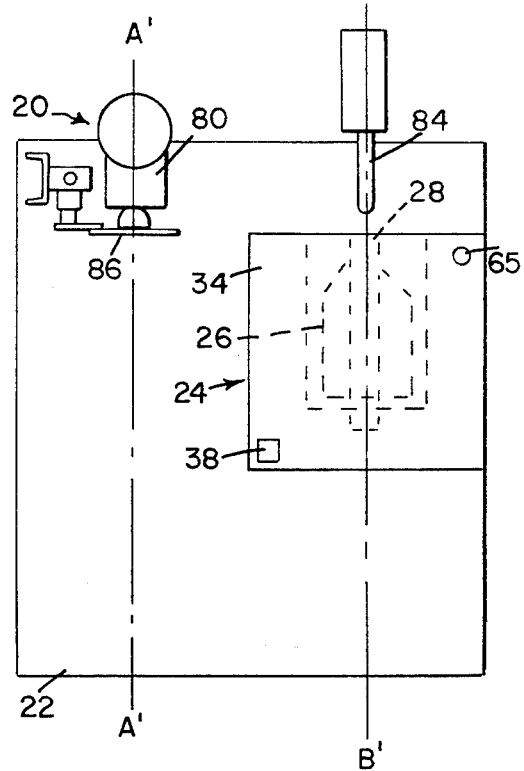
FIG. 6 is a schematic front elevational view similar to FIG. 2 showing the mold at the blow station.
Figure 7:
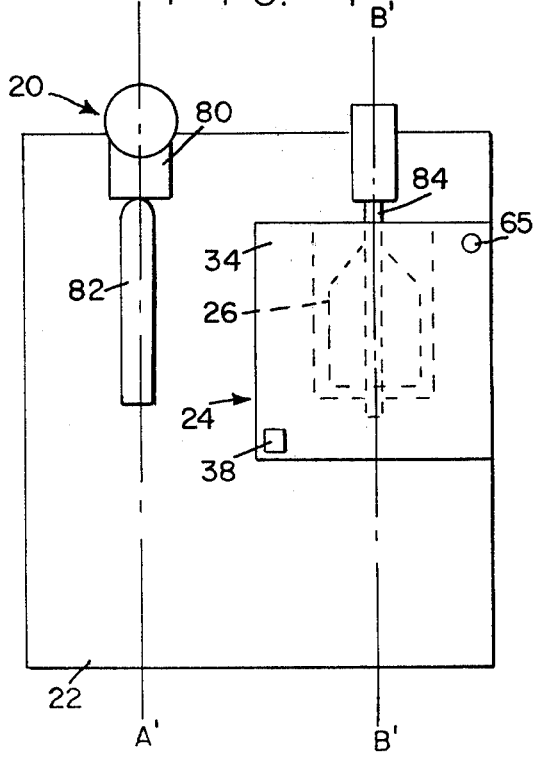
FIG. 7 is a view similar to FIG. 6 showing the blow pipe in blowing position with respect to the mold and the formation of a new preform at the preform station.

Referring to FIGS. 1 and 2, a plastic extruder 80 is located along axis A—A for extruding a preform of thermoplastic material 82 along a vertical axis A'—A' at the point where axis A—A intersects line C—C. This apparatus represents a preform station at which station the preform 82 is vertically aligned with opening 28. An elongated blow pipe 84 extends along a vertical axis B'—B' located at the point where axis A—A and line C—C intersect. Blow pipe 84 is vertically aligned with opening 28 when the mold is in the right-hand position as shown in FIGS. 6 and 7. Blow pipe 84 represents a blow station for expanding a preform within the mold cavity.

Figure 8:
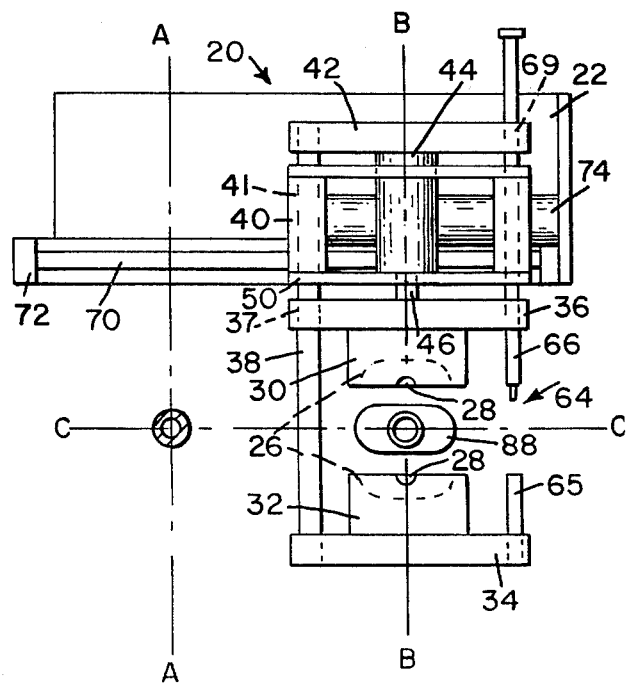
FIG. 8 is a schematic view similar to FIG. 5 showing the mold in open position at the blow station after formation of a hollow article.

The operation and advantages of the present invention will now be readily understood in view of the above description. Referring to FIGS. 1 and 2, the mold is in the closed description. Referring to FIGS. 1 and 2, the mold is in the closed position at the preform station and the preform 82 of thermoplastic material extends from extruder 80 along axis A'—A' and lies within cavity 26. Preform 82 is then severed by a knife 86 just above the mold and cylinder 34 is actuated to drawn end piston 76 and shift the entire carriage assembly 48 together with mold 24 from the preform station, the left-hand position shown in FIG. 1 to the blow station, the right-hand position shown in FIGS. 5 and 6. The mold 24 arrives at the blow station in closed position as shown in FIG. 5 and blow pipe 84 is vertically aligned along axis B'—B' with opening 28 of the mold as shown in FIG. 6. Although many types of preforms may be used with the present invention, it is preferred that the preform be tubular. As shown in FIG. 7, the blowpipe 84 is moved downwardly along axis B'—B' through opening 28 and into the preform. The mechanism for providing downward motion to blow pipe 84 is not shown, but may comprise any conventional drive mechanism well known in the art. A compressed gas is introduced into the mold through blow pipe 84 in a manner well known in the art to expand the preform 82, so that it fills the mold cavity 26. After the preform has been expanded to fill the mold cavity, cylinder 44 is actuated to draw piston 46 into the cylinder and thereby separate the mold halves 30 and 32 to the open position shown in FIG. 8. The article which has been formed in the mold is indicated by the reference numeral 88 and remains in contact with the blow pipe 84 as the mold halves 30 and 32 move away from line C—C, thereby separating the articles 88 from the mold. Cylinder 74 is actuated to extend piston 76 to move the mold 24 in the open position from the blow station as shown in FIG. 8 to the preform station as shown in FIG. 9. Since the mold 24 moves into the preform station in the open condition and supporting spar 38 is located below the mold cavity, there is no interference between the mold and a new preform 82 which has been formed by the extruder 80. Since the first and second locking elements 65 and 66 of locking means 64 are separated, there is no interference between the locking means and the article 88 as the mold moves from the blow station shown in FIG. 8 to the preform station shown in FIG. 9. It is clear from the above description that the invention provides for relative motion between the mold and a preform and between the mold and the formed article, whether the mold is moved between two permanent stations, as shown in the present application, or whether the mold is maintained in one position and the preform and blow pipe are moved relative to the mold.

FIGS. 11 and 12 show a first modified molding device indicated generally by the reference numeral 90. Molding device 90 is identical to molding device 20 in every respect, except that the locking means indicated generally by the references numeral 64' is located adjacent the upper left-hand corner of the mold and the supporting spar indicated by the reference numeral 38' is located adjacent the lower right-hand corner of the mold diametrically opposed from the locking means 64'. Extruder 80' and blow pipe 84' are identical with and are located in the same positions as extruder 80 and 84, respectively. When the mold 24' is moved from the blow station to the preform station from right to left, as shown in FIGS. 11 and 12, the open locking means 64', as shown in FIG. 12, clears a preform 82' extending from extruder 80'. The single supporting spar 38' located below the mold cavity moves past the formed article 88' without interference as the mold 24' moves from the blow station to the preform station.

It is apparent from the description that the provision of a single supporting spar located below and to one side of the mold cavity together with a single locking means enables relative motion to occur between the formed article and the mold along each side of the mold without interference and permits the formed article to be dropped between the separated mold halves if desired.

Figure 13:
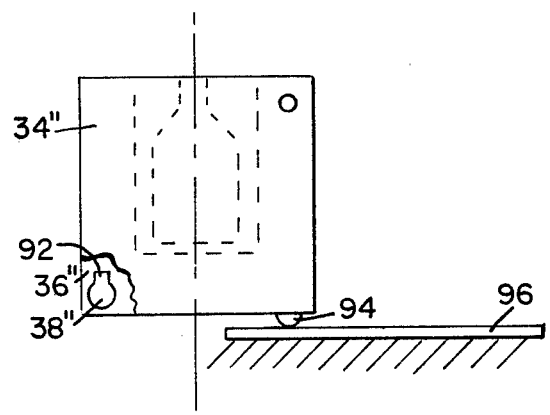
FIG. 13 is a schematic front elevational view of a second modification.

According to the embodiment of FIG. 13 the supporting spar 38" has a circular cross-section, but has a guide part 92 which can be a spline or keyway. Furthermore, the front and rear plates 34" and 36" are each provided with a slidable skid 94. A large table-like support element 96 or some other support element is available for supporting the skids 94.

Figure 14:
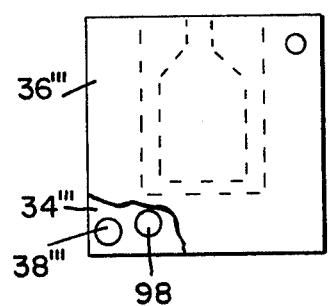
FIG. 14 is a schematic elevational view showing a third modification.

The embodiment of FIG. 14 shows a supporting spar 38'''' and an additional spar 98 adjacent the spar 38'''. The additional spar 98 extends parallel to the spar 38''' and is located in the same corner of each of the front and rear plates 34''' and 36''', respectively. Several additional spars can be used if they extend near enough along the supporting spar 38''' so that the character of one-spar system is retained.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Molding device for the manufacture of hollow articles of thermoplastic material comprising:
   (a) a mold having a cavity for receiving a pre-cast of thermoplastic material and an upper opening leading to the cavity for receiving a blow pipe, said mold being divided within a vertical plane extending through the cavity to form two mold halves,
   (b) a single elongated supporting spar having a central longitudinal axis transverse to said plane for fully supporting said mold below the cavity, said mold halves being mounted on said spar at a point below the cavity, at least one of said mold halves being slidingly mounted on said spar for movement along said axis between a closed position in which the mold halves are together and an open position in which the mold halves are separated, and
   (c) locking means comprising a locking element on each mold half at a point above the bottom of the cavity and spaced from the cavity, said locking elements extending toward each other for locking engagement when the mold is in the closed position, said locking elements being separated sufficiently when the mold is in the open position to allow a pre-cast and an article produced by the mold to pass between the locking elements.

2. Molding device for the manufacture of hollow articles of thermoplastic material comprising:
   (a) a mold having a cavity for receiving a pre-cast of thermoplastic material and an upper opening leading to the cavity, said mold being divided along a vertical plane extending through the cavity to form two mold halves,
   (b) a pre-cast station for forming an elongated pre-cast of moldable thermoplastic material extending along a first vertical axis within said plane, (c) a blow station containing a blow pipe which extends along a second vertical axis spaced from said first vertical axis for insertion into said upper opening and for expanding a pre-cast within said cavity to form a hollow article, (d) means for causing relative motion between said mold halves between a closed position in which the mold halves are together and an open position in which the mold halves are separated, (e) means for moving said mold between said pre-cast station wherein a pre-cast is received into the mold cavity and said blow station wherein the blow pipe is vertically aligned with said upper opening, (f) a single elongated supporting spar having a central longitudinal axis transverse to said plane for fully supporting said mold below the cavity, said mold halves being fixed against rotation about said axis and at least one of said mold halves being slidingly mounted on said spar for movement along said spar axis between said open and closed position, and (g) locking means comprising a locking element on each mold half at a point above the bottom of the cavity and spaced from said cavity, said mold halves being engaged in a locking relationship when the mold halves are in the closed position and separated when the mold halves are in the open position with sufficient clearance between said locking elements to enable the pre-cast and the hollow article produced by the molding device to pass between said locking elements.

3. Molding device for the manufacture of hollow articles of thermoplastic material comprising:

(a) a mold having a cavity for receiving a pre-cast of thermoplastic material and an upper opening leading to the cavity, said mold being divided along a vertical plane into two mold halves, (b) a single elongated supporting spar having a central longitudinal axis transverse to said vertical plane for fully supporting the mold below the cavity, said mold halves being fixed against rotation about said axis and at least one of the mold halves being slidably mounted on said spar for movement along said spar axis between a closed position in which the mold halves are together and an open position in which the mold halves are separated, (c) means for causing relative motion between the mold halves along said axis between said open and closed positions, (d) means for forming a pre-cast and locating said pre-cast so that its central longitudinal axis extends vertically within said plane and is spaced from the mold, (e) means for causing relative motion between the mold and pre-cast within said plane while the mold halves are separated between a separated position in which the pre-cast and mold are spaced from each other and a joined position in which the pre-cast lies between the mold halves and aligned with the mold cavity, and (f) locking means comprising a locking element on each mold half at a point above the bottom of the cavity and spaced from the cavity, said mold halves being engaged in a locking relationship when the mold halves are in the closed position and separated when the mold halves are in the open position with sufficient clearance between said locking elements to enable the pre-cast and the hollow article produced by the molding device to pass between said locking elements.

4. Molding device as set forth in claim 3, wherein the supporting spar is located at a lower corner of the mold and the locking means is located at an upper corner of the mold, said spar and locking means being located on diagonally opposed corners of the mold.

5. Molding device as set forth in claim 3, wherein each mold half has an aperture for receiving the supporting spar and the spar and aperture having matching polygonal cross sections, whereby the mold halves are prevented from rotating about the spar.

6. Molding device as set forth in claim 3, wherein the supporting spar is cylindrical and each mold half has a cylindrical opening for receiving the spar, the mold being locked against rotation about the longitudinal axis of the spar by a key and keyway construction.

7. Molding device as set forth in claim 3 wherein the mold is prevented from rotating about the longitudinal axis of the spar by means of a locking rod located adjacent to and extending parallel with the spar.

8. Molding device as set forth in claim 3, wherein the means for causing relative motion between the mold halves causes the mold halves to move in opposite directions toward and away from said vertical plane.

9. Molding device as set forth in claim 8, wherein mold halves are caused to move relative to said plane by equal amounts.

10. Molding device as set forth in claim 9, wherein the means for causing relative motion between mold halves comprise:

(a) a pinion gear mounted for rotation about a fixed drive axis extending parallel to said plane, (b) a first toothed rack fixed to one of said mold halves and drivingly engaged with said pinion gear, and (c) a second toothed rack fixed to the other of said mold halves and drivingly engaged with said pinion gear on a side opposite from said first toothed rack.

* * * * *